(12) United States Patent
Nishioki

(10) Patent No.: US 6,496,266 B1
(45) Date of Patent: Dec. 17, 2002

(54) MEASURING DEVICE FOR ABSOLUTE MEASUREMENT OF DISPLACEMENT

(75) Inventor: Nobuhisa Nishioki, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/516,630

(22) Filed: Mar. 1, 2000

(30) Foreign Application Priority Data

Mar. 5, 1999 (JP) .......................................... 11-058253

(51) Int. Cl.$^7$ ................................................. G01B 9/02
(52) U.S. Cl. .................................... 356/486; 356/498
(58) Field of Search .............................. 356/498, 500, 356/486, 487, 517

(56) References Cited

U.S. PATENT DOCUMENTS

| | | | | |
|---|---|---|---|---|
| 4,813,783 A | * | 3/1989 | Torge | 356/498 |
| 5,631,736 A | * | 5/1997 | Thiel et al. | 356/486 |

FOREIGN PATENT DOCUMENTS

JP      A-59-79114      5/1984

* cited by examiner

*Primary Examiner*—Samuel A. Turner
*Assistant Examiner*—Patrick Connolly
(74) *Attorney, Agent, or Firm*—Oliff & Berridge, PLC

(57) ABSTRACT

Displacement detector 1 generates bi-phase sine wave signals S1A and S1B with a period of P1 in accordance with a displacement L to be detected. Another displacement detector 2 generates bi-phase sine wave signals S2A and S2B with a period of P2 different from the period P1 in accordance with the displacement L to be detected. Wavelength composing means 3 composes the sine wave signals S1A, S2A and the cosine wave signals S1B, S2B output from the displacement detectors 1 and 2 to generate bi-phase sine wave signals, SxA=S1A·S2B−S1B·S2A and SxB=S1B·S2B+S1A·S2A, with a period of Px equal to the least common multiple between the periods P1 and P2. Then, detecting each phase of a fine resolution signal comprising either of outputs from the displacement detectors 1 and 2 and a coarse resolution signal comprising the output signal from the wavelength composing means 3, and computing the displacement L as an absolute position within said period Px based on the phase information.

11 Claims, 10 Drawing Sheets

$S1A = k1 \sin\left(\frac{2\pi L}{P1} + \phi 1\right)$ $S1B = k1 \cos\left(\frac{2\pi L}{P1} + \phi 1\right)$ $S2A = k2 \sin\left(\frac{2\pi L}{P2} + \phi 2\right)$ $S2B = k2 \sin\left(\frac{2\pi L}{P2} + \phi 2\right)$

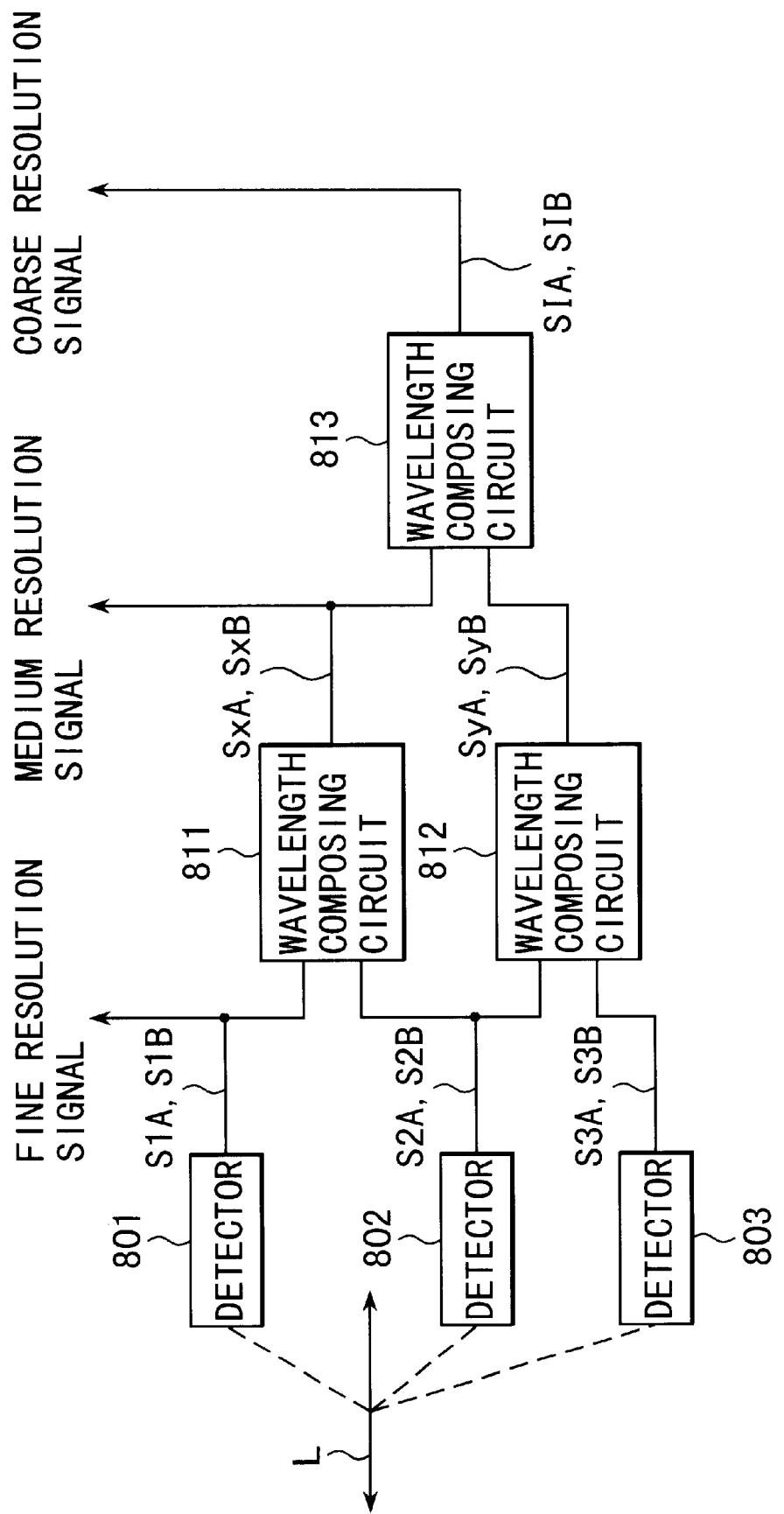

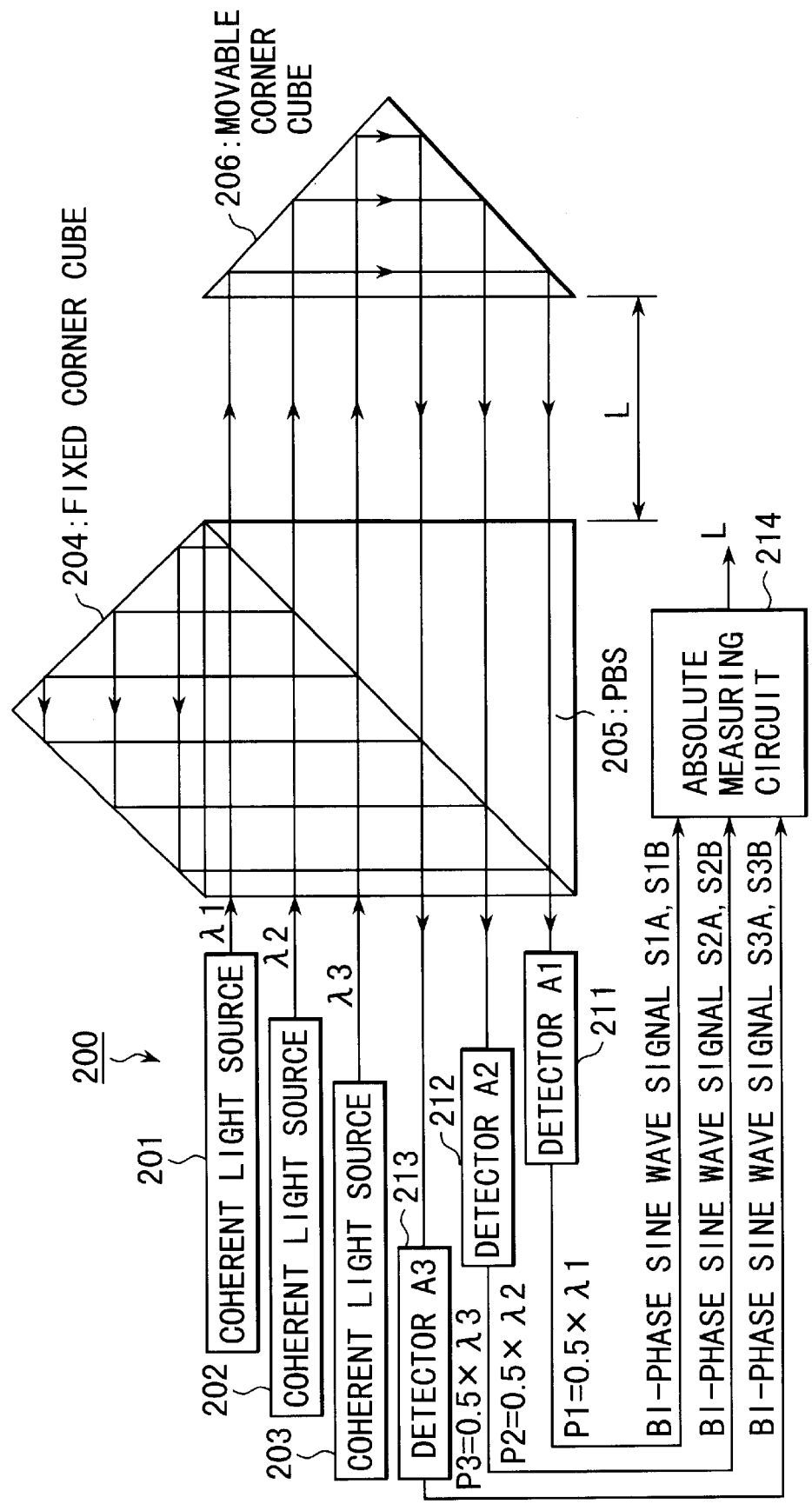

MEASURING DEVICE FOR ABSOLUTE MEASUREMENT OF DISPLACEMENT

BACKGROUND OF THE INVENTION

1. Field of the Invention

The present invention relates to a device for measuring an absolute displacement, which is applicable to a linear encoder, a lightwave interferometer for measuring a length, and the like.

2. Description of the Related Art

Devices for detecting a mechanical displacement of an object have been know in the art as a linear encoder of scale type and a lightwave interferometer, for example. These displacement detection devices include in principle an incremental type for detecting a relative displacement and an absolute type for detecting an absolute displacement. The incremental type device employs a displacement detector that generates a sine wave signal in response to the mechanical displacement, and counts the number of periods of the resultant sine wave signal to obtain a relative displacement (position). The absolute type device employs displacement detectors that generate a plurality of sine wave signals with different signal periods, detects phases of respective sine wave signals, and composes the resultant position information to obtain an absolute displacement (position).

Specifically employed in the case of the absolute type device are such displacement detectors that generate, for example, three sine wave signals with greatly different periods from each other. The sine wave signal with the largest period is a coarse resolution signal; the sine wave signal with a smaller period than the largest period is a medium resolution signal; and the sine wave signal with much smaller period is a fine resolution signal. A high precise absolute displacement can be obtained within a period of the coarse resolution signal by performing a process of interpolating the position information of the coarse resolution signal corresponding to an objective displacement with the medium resolution signal and further interpolating it with the fine resolution signal.

As described above, the absolute displacement measuring device requires the plural displacement detectors to generate the sine wave signals with greatly different periods. An absolute measurement can not be performed in principle within an additional measuring range that exceeds the originally prepared measuring range of the displacement detector. Then, there is proposed a wavelength composing method that employs displacement detectors prepared to generate two sine wave signals with close periods and composes their outputs to obtain a sine wave signal with a larger period, from which an absolute measurement can be performed within a broader measuring range that is not planned originally in the displacement detectors (for example, in JP 59-79114A).

In the wavelength composing method proposed in the art, a finite difference is calculated between a triangular wave signal with a period of P1 as shown in FIG. 12A and a triangular wave signal with a period of P2 as shown in FIG. 12B to obtain a composed signal with a period of P1·P2/(P2−P1) as shown in FIG. 12C. The closer the periods P1 and P2, the larger the period of the synthesized signal, P1·P2/(P2−P1). By using the composed signal as the coarse resolution signal and calculating the number of the period P1 or P2 and a fraction distance within the coarse resolution signal, an absolute position can be obtained within a period of the coarse resolution signal.

In the wavelength composing method proposed in the art, however, an error occurs at a transition of the period as shown in FIG. 12D when calculating the finite difference simply. Therefore, correction arithmetic is inevitably required to correct the error in order to obtain such the composed signal as shown in FIG. 12C. Instead of performing such the correction arithmetic, there is another detecting system that squares a beat signal that is generated from two modulated signals when they are mixed, and detects it through a low pass filter. This detecting system, however, has a disadvantage that requires a precise modulation.

In the conventional wavelength composing method, it is not considered to perform a multiple composing that further composes the composed period signal with another period signal. Because the above described correction arithmetic and modulation are strongly required to have a higher precision when the period of the composed wavelength becomes extremely greater than the period of the original signal. If such the multiple composing is not performed, two displacement detectors with extremely close periods are required to obtain a period signal with a larger measuring range. To prepare such the displacement detectors, in the case of electrical displacement detectors, for example, it is difficult to obtain a scale with a very small difference in graduations due to a limitation to accuracy for processing graduations of the scale. In addition, in the case of optical displacement detectors, it is difficult to realize a wide measuring range because a wavelength of a light source can not be selected freely with ease.

SUMMARY OF THE INVENTION

An object of the present invention is to provide a device for measuring an absolute displacement, which is capable of measuring an absolute displacement based on a long period signal obtained from a wavelength composition with a simple arithmetic.

A first aspect of the present invention is provided with a measuring device for absolute measurement of displacement, comprising: a first displacement detector for generating a sine wave signal S1A and a cosine wave signal S1B both with a period of P1 in accordance with a displacement L to be detected; a second displacement detector provided in parallel to the first displacement detector for generating a sine wave signal S2A and a cosine wave signal S2B both with a period of P2 different from the period of P1 in accordance with the displacement L to be detected; a wavelength composing circuit for composing the sine wave signals S1A, S2A and the cosine wave signals S1B, S2B from the first and second displacement detectors to obtain a sine wave signal, SxA=S1A·S2B−S1B·S2A, and a cosine wave signal, SxB=S1B·S2B+S1A·S2A, both with a period of Px equal to the least common multiple between the periods P1 and P2; a phase detector for detecting a phase of a fine resolution signal comprising either of output signals obtained from the first and second displacement detectors and a phase of a coarse resolution signal comprising the output signal from the wavelength composing circuit; and a distance arithmetic circuit for computing the displacement L as an absolute position within the period Px based on phase information detected by the phase detector.

A second aspect of the present invention is provided with a measuring device for absolute measurement of displacement, comprising: a first displacement detector for generating a sine wave signal S1A and a cosine wave signal S1B both with a period of P1 in accordance with a displacement L to be detected; a second displacement detector provided in parallel to the first displacement detector for generating a sine wave signal S2A and a cosine wave signal S2B both with a period of P2($\neq$P1) in accordance with the displacement L to be detected; a third displacement detector provided in parallel to the first and second displacement detectors for generating a sine wave signal S3A and a cosine wave signal S3B both with a period of P3 ($\neq$P2, P1, and |P3−P2|$\neq$|P2−P1|) in accordance with the displacement L to be detected; a first wavelength composing circuit for composing the sine wave signals S1A, S2A and the cosine wave signals S1B, S2B obtained from the first and second displacement detectors to obtain a sine wave signal, SxA=S1A·S2B−S1B·S2A, and a cosine wave signal, SxB=S1B·S2B+S1A·S2A, both with a period of Px equal to the least common multiple between the periods P1 and P2; a second wavelength composing circuit for composing the sine wave signals S2A, S3A and the cosine wave signals S2B, S3B obtained from the second and third displacement detectors to obtain a sine wave signal, SyA=S2A·S3B−S2B·S3A, and a cosine wave signal, SyB=S2B·S3B+S2A·S3A, both with a period of Py equal to the least common multiple between the periods P2 and P3; a third wavelength composing circuit for composing the sine wave signals SxA, SyA and the cosine wave signals SxB, SyB obtained from the first and second wavelength composing circuits to obtain a sine wave signal, S1A=SxA·SyB−SxB·SyA, and a cosine wave signal, S1B=SxB·SyB+SxA·SyA, both with a period of Pl equal to the least common multiple between the periods Px and Py; a phase detector for detecting a phase of a fine resolution signal comprising either of output signals obtained from the first through third displacement detectors, a phase of a medium resolution signal comprising an output signal from the first or second wavelength composing circuit, and a phase of a coarse resolution signal comprising the output signal from the third wavelength composing circuit; and a distance arithmetic circuit for computing the displacement L as an absolute position within the period Pl based on phase information of the fine, medium and coarse resolution signals detected by the phase detectors.

According to the present invention, an absolute position can be obtained precisely within a period of a composed bi-phase sine wave signal with a long period, which is obtained through a wavelength composing with a simple arithmetic including multiplication, addition and subtraction of two bi-phase sine wave signals. In addition, according to the present invention, a coarse resolution signal with a high period precision can be obtained by performing multiple wavelength composing, in which two bi-phase sine wave signals are obtained by performing wavelength composing among three bi-phase sine wave signals and are further directed to another wavelength composing. As a result, an absolute position can be measured precisely within a wider measuring range.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 8 is a diagram illustrating a configuration of a device for measuring an absolute displacement according to a second embodiment of the present invention, which includes displacement detectors and a wavelength composing for the outputs of the detectors;

FIG. 11 is a diagram illustrating a configuration of a measuring device according to a fourth embodiment, which incorporates the system of the second embodiment.

DETAILED DESCRIPTION OF THE PREFERRED EMBODIMENTS

[First Embodiment]

Figure 1:
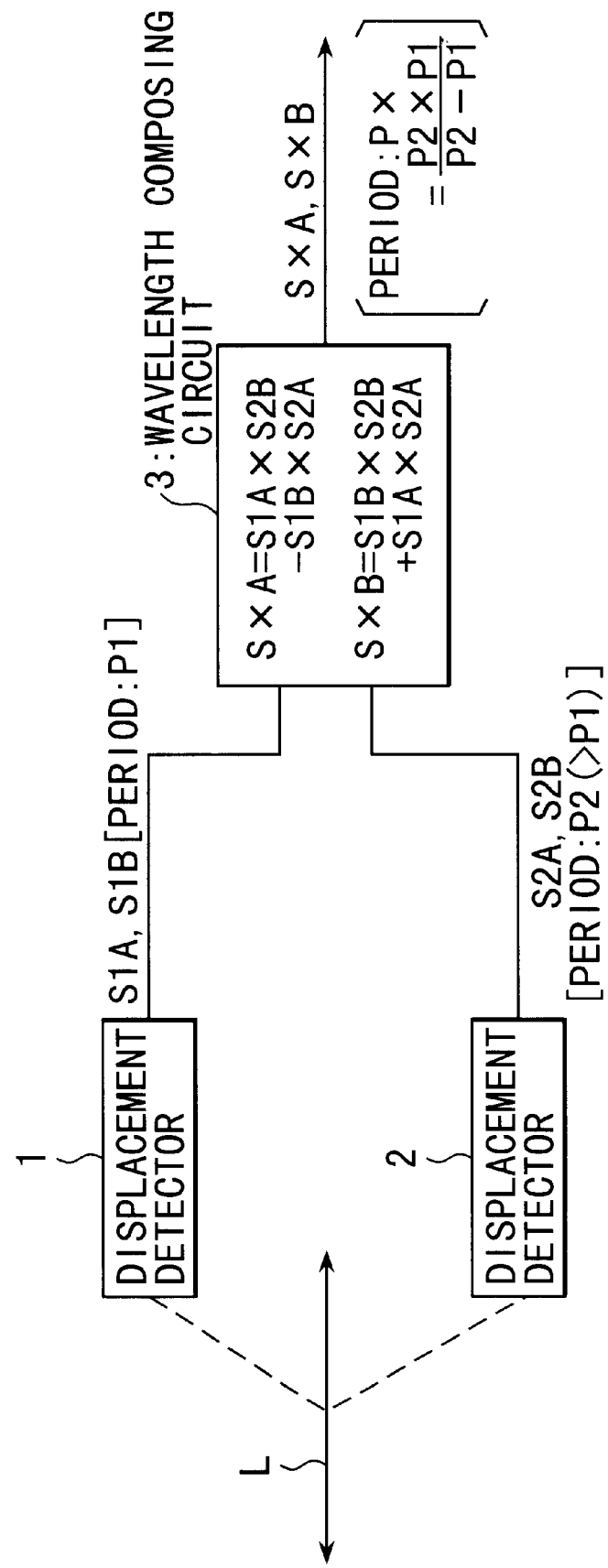
FIG. 1 is a diagram illustrating a configuration of a device for measuring an absolute displacement according to a first embodiment of the present invention, which includes displacement detectors and a wavelength synthesizer for the outputs of the detectors.
Figure 2:
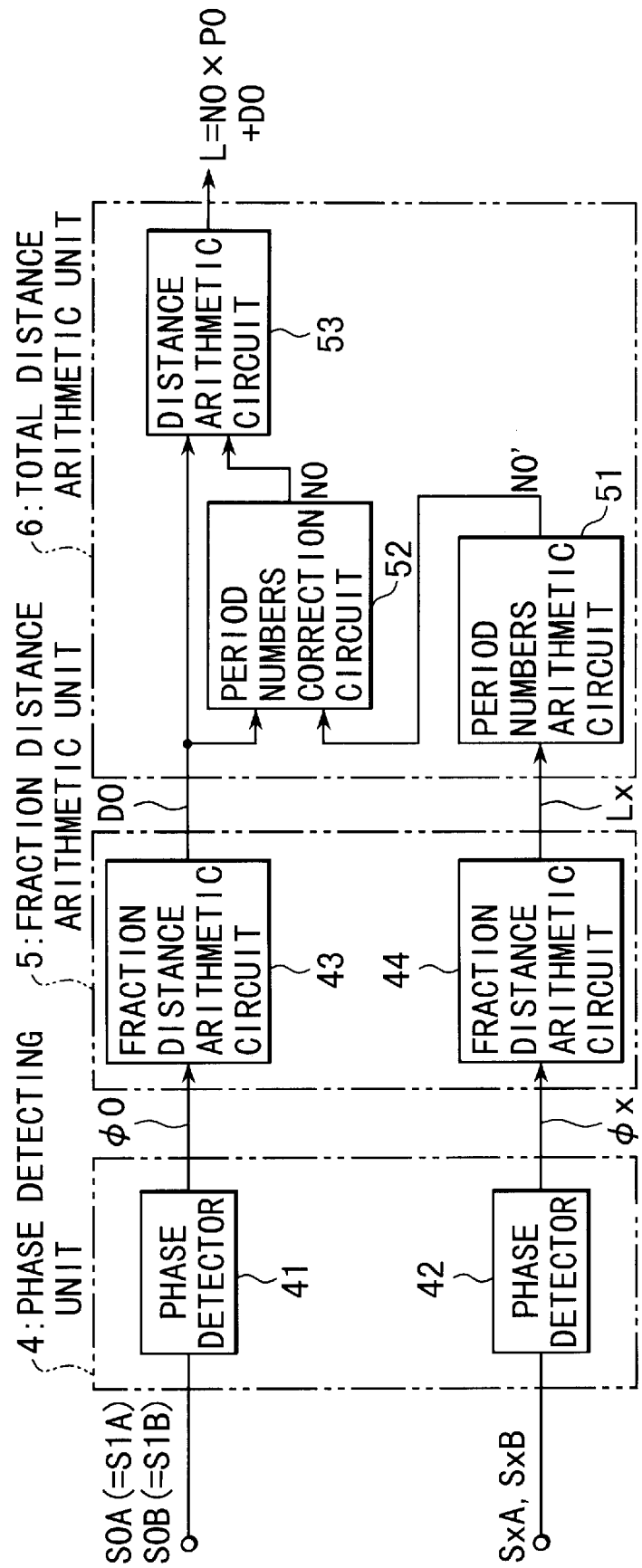
FIG. 2 is a diagram illustrating a configuration of a signal processor in the first embodiment.

FIGS. 1 and 2 show a configuration of a measuring device of a first embodiment using two displacement detectors 1 and 2. FIG. 1 illustrates a configuration of the displacement detectors 1, 2 and a wavelength composing circuit 3 for composing the output signals of the detectors. FIG. 2 illustrates a configuration of a circuitry for computing an absolute displacement (position) using the output signal obtained from the wavelength composing circuit 3 and either of the outputs from the displacement detectors.

As the displacement detectors 1 and 2 employed in the first embodiment may be those that can generate bi-phase sine wave signals with a certain period in response to a mechanical displacement of an object to be detected. Specific examples thereof will be described later. The sine wave signals output from these displacement detectors 1 and 2 in response to the mechanical displacement have periods (that is, wavelengths) of P1 and P2, respectively. These values are close to but different from each other and specifically defined P1<P2 in this embodiment. When the displacement to be detected is defined L, bi-phase sine wave signals (a sine wave signal S1A and a cosine wave signal S1B) from one displacement detector 1 are represented by the following expression (1).

$$S1A = k1 \sin(2\pi L/P1 + \phi 1)$$

$$S1B = k1 \cos(2\pi L/P1 + \phi 1) \qquad \text{expression (1)}$$

Figure 3A:
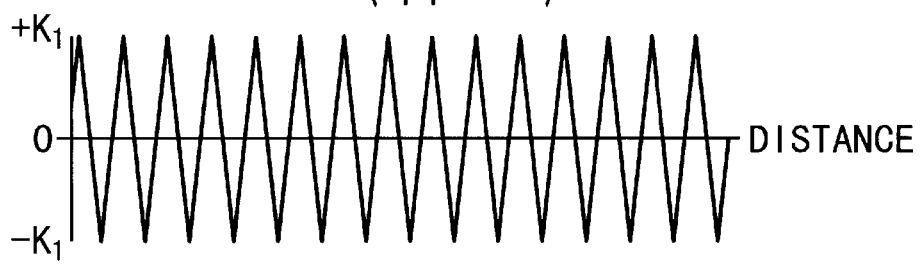
FIGS. 3A and 3B are diagrams showing waveforms of the output signals from one displacement detector in the first embodiment.
Figure 3B:
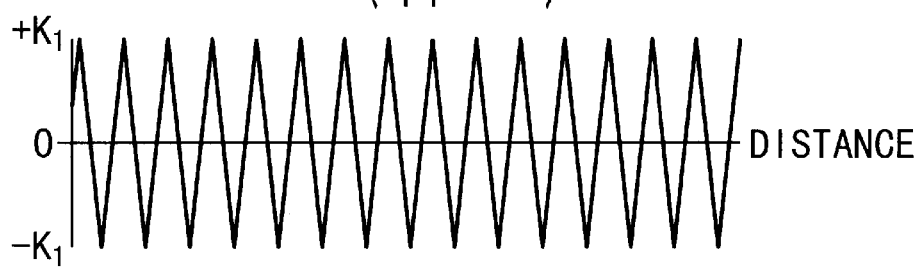

FIGS. 3A and 3B show these bi-phase sine wave signals S1A and S1B. Bi-phase sine wave signals (a sine wave signal S2A and a cosine wave signal S2B) from the other displacement detector 2 are represented by the following expression (2).

$$S2A = k2\ \sin(2\pi L/P2 + \phi 2)$$

$$S2B = k2\ \cos(2\pi L/P2 + \phi 2) \quad \text{expression (2)}$$

Figure 4A:
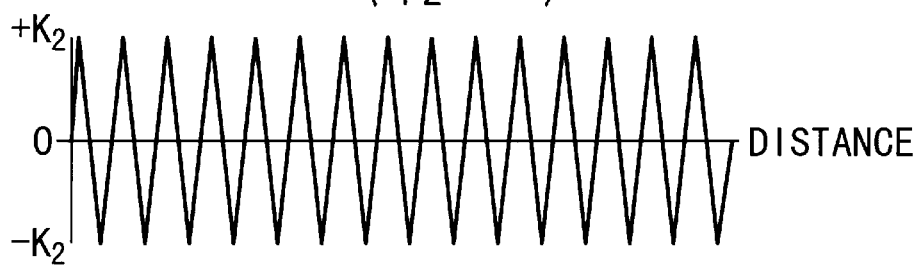
FIGS. 4A and 4B are diagrams showing waveforms of the output signals from the other displacement detector in the first embodiment.
Figure 4B:
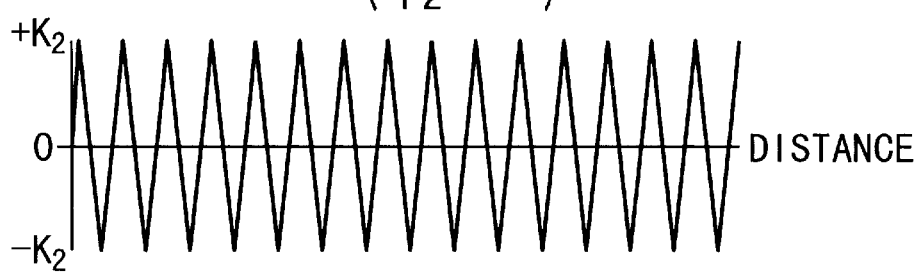

FIGS. 4A and 4B show these bi-phase sine wave signals S2A and S2B. In the equations (1) and (2), $\phi 1$ and $\phi 2$ denote original phases, and k1 and k2 denote signal amplitudes, which are essentially constant.

The wavelength composing circuit 3 comprises the output signals from these displacement detectors 1 and 2 to obtain a sine wave signal SxA and a cosine wave signal SxB in accordance with the following expression (3).

$$SxA = S1A \cdot S2B - S1B \cdot S2A$$

$$SxB = S1B \cdot S2B + S1A \cdot S2A \quad \text{expression (3)}$$

Figure 5A:
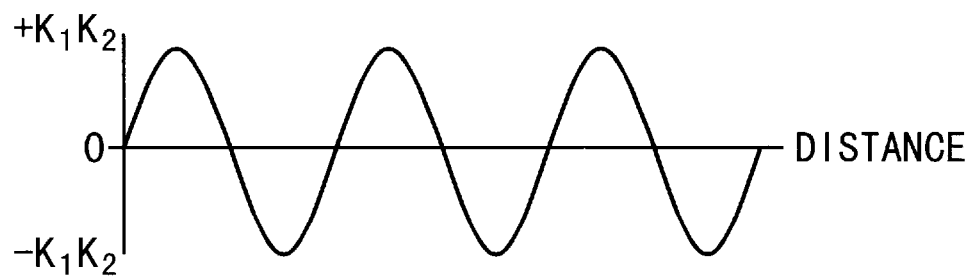
FIGS. 5A and 5B are diagrams showing waveforms of the synthesized signals in the first embodiment.
Figure 5B:
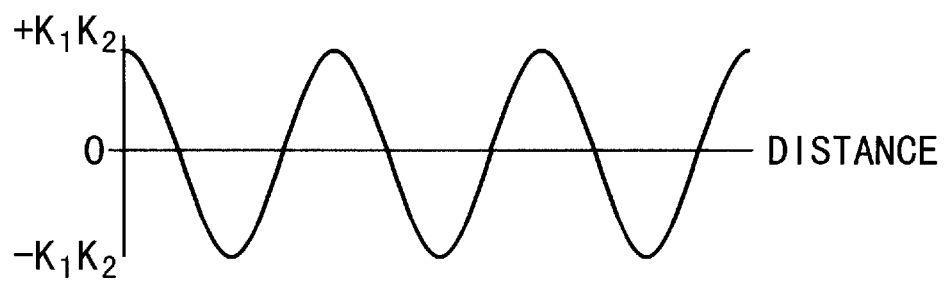

FIGS. 5A and 5B respectively show thus composed bi-phase sine wave signals (the sine wave signal SxA and cosine wave signal SxB). Specifically substituting expressions (1) and (2) into the expression (3) yields the following expression (4).

$$SxA = k1k2\ \sin\{2\pi L(P2-P1)/P2P1 + (\phi 1 - \phi 2)\}$$

$$SxA = k1k2\ \cos\{2\pi L(P2-P1)/P2P1 + (\phi 1 - \phi 2)\} \quad \text{expression (4)}$$

Thorough such the wavelength synthesis, bi-phase sine wave signals SxA and SxB with a period of P2P1/(P2−P1), which is the least common multiple between the periods P1 and P2 of the original bi-phase sine wave signals, can be obtained. By defining the period (wavelength) of the new bi-phase sine wave signals, Px=P2P1/(P2−P1), the expression (4) is represented by the following expression (5).

$$SxA = k1k2\ \sin\{2\pi L/Px + (\phi 1 - \phi 2)\}$$

$$SxB = k1k2\ \cos\{2\pi L/Px + (\phi 1 - \phi 2)\} \quad \text{expression (5)}$$

The wavelength composing method of this embodiment simply computes the detected two bi-phase sine wave signals and is not required to perform a process of correction with phase comparison, modulation, and filtering. In addition, any significant digit is not cancelled because the arithmetic equations employ no division but multiplication, addition and subtraction. Further, when the bi-phase sine wave signals S1A and S1B have the same amplitudes and phases, and also the bi-phase sine wave signals S2A and S2B have the same amplitudes and phase, the composed bi-phase sine wave signals SxA and SxB can have the same amplitudes and phases even if the amplitudes and phases of the signals S1A and S1B are not equal to those of the signals S2A and S2B.

When using thus composed bi-phase sine wave signals SxA and SxB as coarse resolution signals and the bi-phase sine wave signals output from either of the displacement detectors 1 and 2 as fine resolution signals, the displacement L can be obtained as an absolute displacement within the period of the coarse resolution signal. The displacement L is specifically obtained in this embodiment through the composing process of phase detection and interpolation, using the output signals S1A and S1B from the displacement detector 1 that generates outputs with a smaller period among the displacement detectors 1 and 2 as fine resolution signals S0A and S0B, and also using the composed bi-phase sine wave signals SxA and SxB as the coarse resolution signals.

As shown in FIG. 2, in a phase detecting unit 4, phase detectors 41 and 42 detect phases, $\phi 0$ and $\phi x$, with respect to the fine resolution signals or the bi-phase sine wave signals S0A and S0B and the coarse resolution signals or the composed bi-phase sine wave signals SxA and SxB. A distance arithmetic is performed at a fraction distance arithmetic unit 5 and a total distance arithmetic unit 6 based on the obtained position information. First, the obtained phase angle $\phi x$ is introduced into a fraction distance arithmetic circuit 44 to obtain a distance Lx corresponding to the phase angle $\phi x$ in accordance with an arithmetic on the basis of the following expression (6).

$$Lx = \phi x(Px/2\pi) \quad \text{expression (6)}$$

The distance Lx obtained from the expression (6) includes an error due to signal propagation and interpolation. Therefore, it is required to perform a higher precise detection with reference to this value, using the fine resolution signals, S0A and S0B. The obtained distance Lx is necessary to have a sufficient precision, (±P0/2), to specify the number of periods of the bi-phase sine wave signals S0A and S0B. The obtained distance Lx is then introduced into a period numbers arithmetic circuit 51 in the total distance arithmetic unit 6 to obtain an assumed fraction distance, D0', and the number of periods, N0', represented by the following expression (7).

$$D0' = Lx\ \%\ P0$$

$$N0' = Lx/P0 - Lx\ \%\ P0 \quad \text{expression (7)}$$

Figure 6:
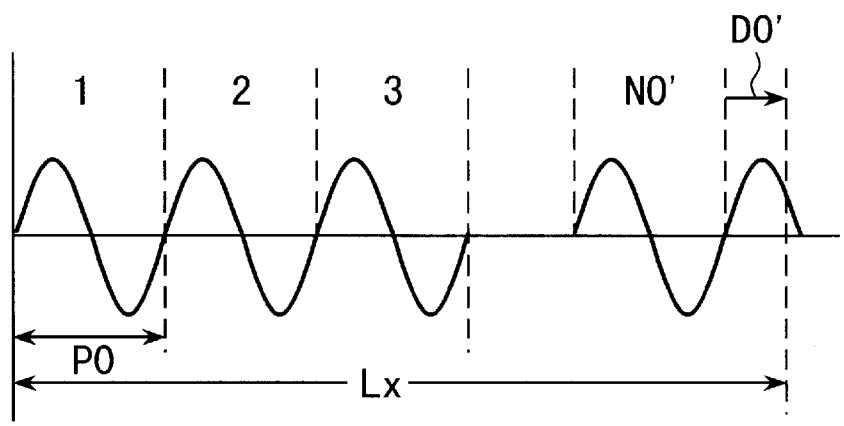
FIG. 6 is a diagram explaining a principle of distance arithmetic in the first embodiment.

The expression (7) means that D0' denotes a remainder when Lx is divided by P0, and that N0' denotes an integer when Lx is divided similarly by P0 as shown in FIG. 6. On the other hand, the phase angle $\phi 0$ obtained from the fine resolution signals is computed at another fraction distance arithmetic circuit 43 in the same manner to obtain a fraction distance D0. If the previously obtained period numbers N0' is correct, a distance is obtained with this value and the fraction distance D0 through an arithmetic, N0'·P0+D0. The period numbers N0' is, however, required to correct an error that is included therein due to the error contained in the distance Lx. This can be performed to obtain a correct period numbers N0 at a period numbers correction circuit 52 as the following corrections separated in cases:

(a)

$$N0 = N0' + 1,\ \text{when}\ P0/2 < D0' < P0\ \text{and}\ P0/2 < |D0 - D0'|;$$

(b)

$$N0 = N0' - 1,\ \text{when}\ 0 < D0' < P0/2\ \text{and}\ P0/2 < |D0 - D0'|;$$

(c)

$$N0 = N0'\ \text{in other cases} \quad \text{expression (8)}$$

Figure 7A:
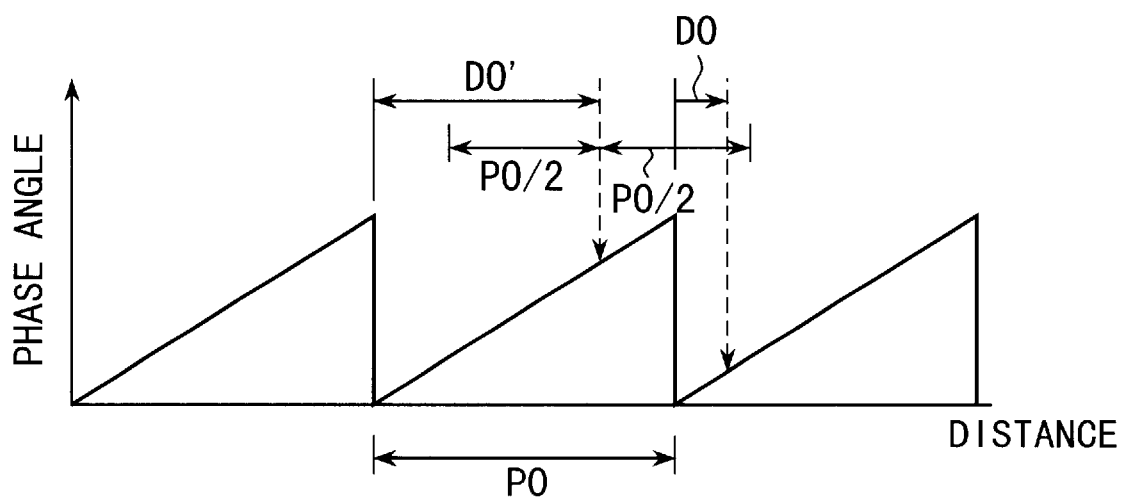
FIGS. 7A and 7B are diagrams explaining a principle of correction to the number of periods in the first embodiment.
Figure 7B:
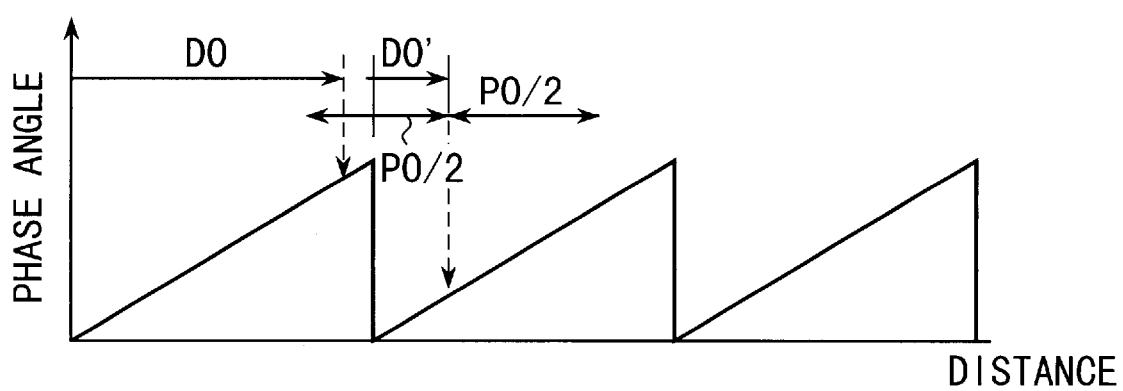

Referring now to FIGS. 7A and 7B, the correction to the period numbers by the expression (8) can be explained to have the following meaning. FIGS. 7A and 7B show the fine resolution signals with a period of P0 as phase angles. Assuming that the assumed fraction distance D0' is present in the latter half of one period of the fine resolution signal as shown in FIG. 7A. If an absolute value of a finite difference between the fraction distance D0 and the assumed fraction distance D0' is larger than an error range P0/2, it is appreciated that the real fraction distance D0 is present in an upper period by one than the period corresponding to the period numbers N0,' from which the assumed fraction distance D0' is obtained as shown in FIG. 7A. Therefore, the correct period numbers N0 can be obtained by adding 1 to N0' as in the case of (a).

On the other hand, assuming that the assumed fraction distance D0' is present in the former half of one period of the fine resolution signal as shown in FIG. 7B. If an absolute value of a finite difference between the fraction distance D0 and the assumed fraction distance D0' is larger than an error range P0/2, it is appreciated that the real fraction distance D0 is present in a lower period by one than the period, from which the assumed fraction distance D0' is obtained as shown in FIG. 7B. Therefore, the correct period numbers N0 can be obtained by subtracting 1 from N0' as in the case of (b).

Using the period numbers N0 compensated in the above manner, and using the fraction distance D0 and the period P0 of the fine resolution signal, a correct displacement L can be obtained at a distance arithmetic circuit 53 through an arithmetic, L=N0·P0+D0.

As described above, according to this embodiment, a high precise absolute displacement can be measured using a rough resolution signal that is a composed signal with a long period obtained from a simple wavelength composing of bi-phase sine wave signals from two displacement detectors and a fine resolution signal that is one of original bi-phase sine wave signals.

[Second Embodiment]

Three or more displacement detectors can be employed to perform wavelength composing in plural stages in order to extend a measuring range while the first embodiment employs two displacement detectors. A second embodiment that specifically employs three displacement detectors will be described below.

Figure 9:
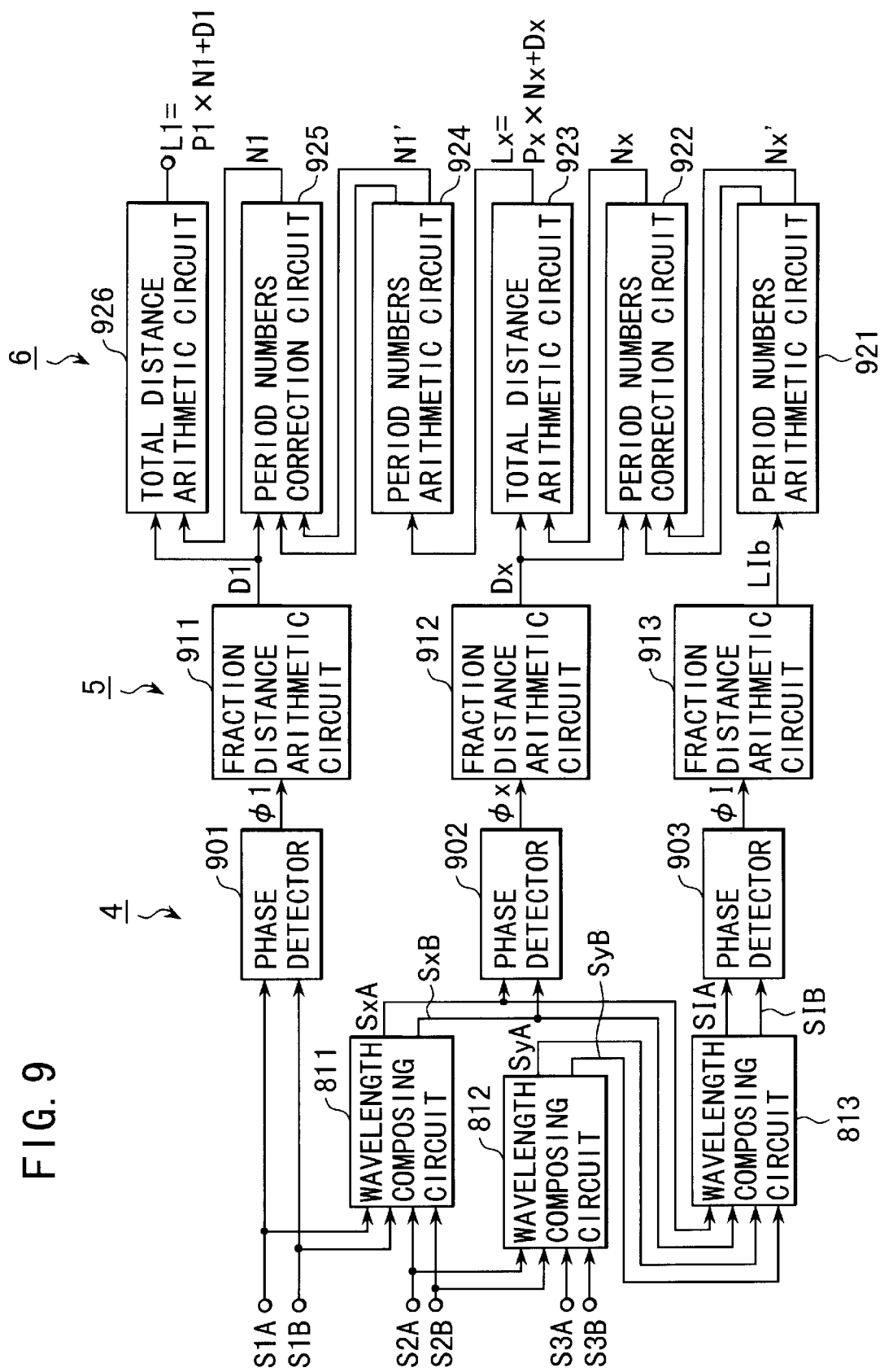
FIG. 9 is a diagram illustrating a configuration of a signal processor in the second embodiment.

FIG. 8 illustrates a configuration of a device for measuring an absolute displacement of the second embodiment, from displacement detectors through a wavelength composing stage for their outputs. FIG. 9 illustrates a configuration of a processing circuit at the subsequent stage.

Three displacement detectors 801, 802 and 803 detect the same displacement L to be detected and generate bi-phase sine wave signals S1 (a sine wave signal S1A and a cosine wave signal S1B), S2 (a sine wave signal S2A and a cosine wave signal S2B) and S3 (a sine wave signal S3A and a cosine wave signal S3B), respectively. The bi-phase sine wave signals (S1A, S1B), (S2A, S2B) and (S3A, S3B) are herein assumed to have periods of P1, P2 and P3 which are close to but different from each other. In this embodiment, they are specifically determined P3>P2>P1. It is also required in this case that a condition, $|P3-P2| \neq |P2-P1|$, is satisfied. These signals are represented by the following expression (9).

$$S1A = k1 \sin(2\pi L/P1)$$
$$S1B = k1 \cos(2\pi L/P1)$$
$$S2A = k2 \sin(2\pi L/P2)$$
$$S2B = k2 \cos(2\pi L/P2)$$
$$S3A = k3 \sin(2\pi L/P3)$$
$$S3B = k3 \cos(2\pi L/P3) \qquad \text{expression (9)}$$

The bi-phase sine wave signals output from a first displacement detector 801 and a second displacement detector 802 are composed at a wavelength composing circuit 811 in the same manner as the preceding embodiment to generate bi-phase sine wave signals Sx (a sine wave signal SxA and a cosine wave signal SxB) with a period of Px equal to the least common multiple between the signal periods P1 and P2. The bi-phase sine wave signals output from the second displacement detector 802 and a third displacement detector 803 are composed at a wavelength composing circuit 812 in the same manner to generate bi-phase sine wave signals Sy (a sine wave signal SyA and a cosine wave signal SyB) with a period of Py equal to the least common multiple between the signal periods P2 and P3.

These composed bi-phase sine wave signals SxA, SxB, SyA and SyB are represented by the following expression (10).

$$SxA = k1k2 \sin\{2\pi\ L(P2-P1)/P2P1\} \qquad \text{expression (10)}$$
$$= kx \sin\{2\pi\ L/Px\}$$
$$SxB = k1k2 \cos\{2\pi\ L(P2-P1)/P2P1\}$$
$$= kx \cos\{2\pi\ L/Px\}$$
$$SyA = k2k3 \sin\{2\pi\ L(P3-P2)/P3P2\}$$
$$= ky \sin\{2\pi\ L/Py\}$$
$$SyB = k2k3 \cos\{2\pi\ L(P3-P2)/P3P2\}$$
$$= ky \cos\{2\pi\ L/Py\}$$

As described above, the period Px and Py have different values from each other under the above condition, $|P3-P2| \neq |P2-P1|$. In addition, in this embodiment, the composed two bi-phase sine wave signals (SxA, SxB) and (SyA, SyB) are further composed at a wavelength composing circuit 813 in the same manner. Thus obtained bi-phase sine wave signals S1A and S1B are represented by the following expression (11).

$$S1A = kxky \sin\{2\pi\ L(Py-Px)/PyPx\} \qquad \text{expression (11)}$$
$$= kl \sin\{2\pi\ L/Pl\}$$
$$S1B = kxky \cos\{2\pi\ L(Py-Px)/PyPx\}$$
$$= kl \cos\{2\pi\ L/Pl\}$$

In this embodiment, an absolute displacement detection is performed using either sine wave signal output from the displacement detectors 801–803 as a fine resolution signal, using either sine wave signal output from the wavelength composing circuits 811 and 812 as a medium resolution signal, and using a sine wave signal output from the last wavelength composing circuit 813 as a coarse resolution signal. FIG. 8 shows a specific case that the output from the displacement detector 801 has the smallest period P1 and is employed as the fine resolution signal. The sine wave signals (SxA, SxB) and (SyA, SyB) output from the wavelength composing circuits 811 and 812 have a magnitude relation between their periods Px and Py, which is determined from a magnitude relation between $|P3-P2|$ and $|P2-P1|$. Though, either of them can be used as the medium resolution signal. In the case shown in FIG. 8, the signals SxA and SxB are employed as the medium resolution signal is shown.

Each of the resolution signals thus obtained is essentially processed in the same manner as in the preceding embodiment. That is, as shown in FIG. 9, phase angle detection for the fine resolution signals S1A, S1B, medium resolution signals SxA, SxB and coarse resolution signals SIA, SIB are performed at phase detectors 901, 902 and 903, respectively. Next, fraction distances are obtained with respect to phase angles φ1, φx and φI at fraction distance arithmetic circuits 911, 912 and 913, respectively. This principle is also the same as that described in the preceding embodiment. A rough distance Llb for the displacement L to be measured can be obtained from the fraction distance arithmetic circuit 913 based on the coarse resolution signals SIA and SIB.

Next, a total distance is computed on the basis of the obtained rough distance Llb, through interpolation with the medium resolution signals, and regarding the result thereof, further interpolation with the fine resolution signals. Namely, based on the rough distance Llb, the number of periods of the medium resolution signals is obtained at a period numbers arithmetic circuit 921 in the same manner as in the preceding embodiment. Then, a total distance Lx (preliminary total distance) is obtained at a total distance arithmetic circuit 923 from the number of periods and the period Px and fraction distance Dx of the medium resolution signal. At the same time, the number of full periods is also compensated at a period numbers correction circuit 922 in the same manner as in the preceding embodiment. Based on the preliminary total distance Lx obtained from the total distance arithmetic circuit 923, the number of periods of the fine resolution signals is obtained at a period numbers arithmetic circuit 924. Then, a final total distance L1 is obtained at a total distance arithmetic circuit 926 from the number of periods and the period P1 and fraction distance D1 of the fine resolution signal. At the same time, the number of full periods is also compensated at a period numbers correction circuit 925.

The period numbers correction circuit 922 corrects the number of periods, Nx', obtained at the period numbers arithmetic circuit 921. This correction is performed in accordance with a magnitude of a finite difference between an assumed fraction distance Dx', which is a remainder obtained from dividing the distance Llb obtained on the basis of the coarse resolution signal by the period Px of the medium resolution signal, and a fraction distance Dx obtained on the basis of the medium resolution signal, and with a phase relation of the assumed fraction distance Dx' in the period Px of the medium resolution signal. Its corrections separated in cases are performed as below:

(a)

$Nx=Nx'+1$, when $Px/2<Dx'<Px$ and $Px/2<|Dx-Dx'|$;

(b)

$Nx=Nx'-1$, when $0<Dx'<Px/2$ and $Px/2<|Dx-Dx'|$;

(c)

$Nx=Nx'$ in other cases                          expression (12)

A corrected preliminary total distance Lx can be obtained from the above correction. Next, the period numbers correction circuit 925 corrects the number of periods, N1', obtained at the period numbers arithmetic circuit 924. This correction is performed in accordance with a magnitude of a finite difference between an assumed fraction distance D1', which is a remainder obtained from dividing the distance Lx obtained on the basis of the fine resolution signal by the period P1 of the fine resolution signal, and with a fraction distance D1 obtained on the basis of the fine resolution signal, and a phase relation of the assumed fraction distance D1' in the period P1 of the fine resolution signal. Its corrections separated in cases are performed as below:

(a)

$N1=N1'+1$, when $P1/2<D1'<P1$ and $P1/2<|D1-D1'|$;

(b)

$N1=N1'-1$, when $0<D1'<P1/2$ and $P1/2<|D1-D1'|$;

(c)

$N1=N1'$ in other cases                          expression (13)

Through the above correction, the final total distance L1 can be obtained at a total distance arithmetic circuit 926 as L1=P1 (N1+D1. Thus, a precise distance L can be computed by correcting the distance Llb obtained on the basis of the rough resolution signal.

According to this embodiment, a large measuring range can be realized with the use of multiple wavelength composing, without the use of original displacement detectors that have extremely close periods of the outputs. Therefore, the scale processing can be performed easily in the case of the electric displacement detector. It is also possible to obtain a device with a large measuring range in the case of the optical displacement detector.

[Third Embodiment]

Figure 10:
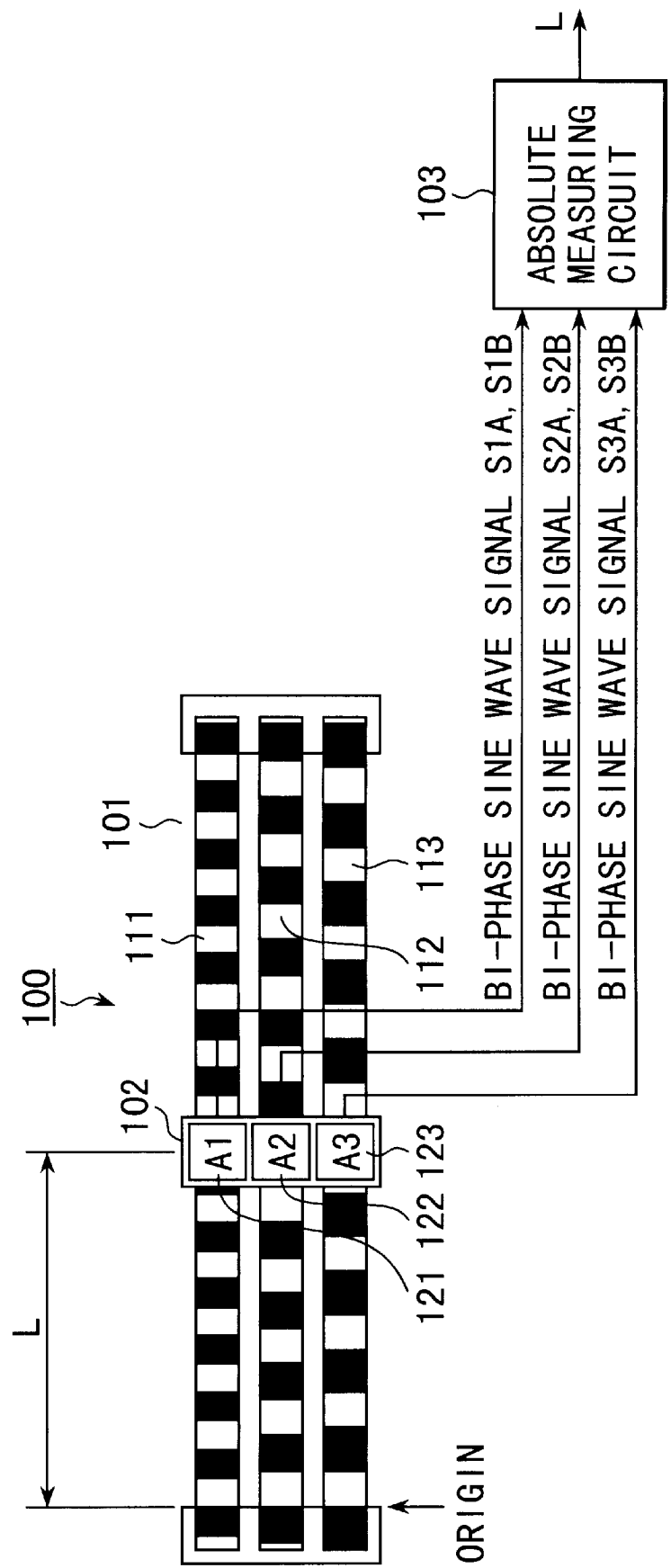
FIG. 10 is a diagram illustrating a configuration of a measuring device according to a third embodiment, which incorporates the system of the second embodiment.
Figure 12A:
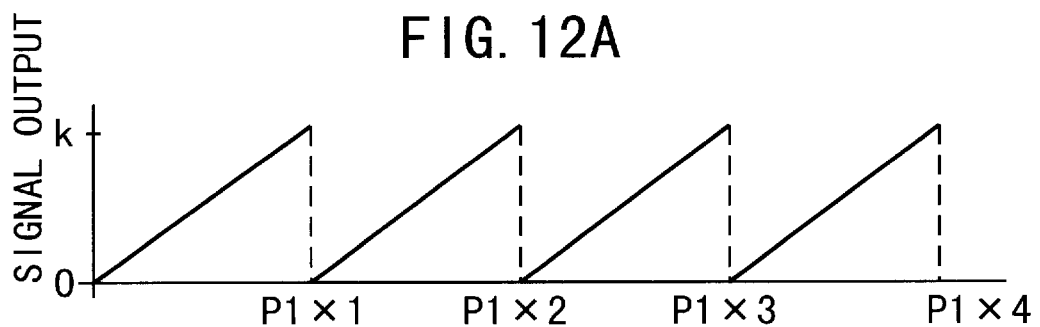
FIGS. 12A through 12D are diagrams explaining a wavelength composing method in the art.
Figure 12B:
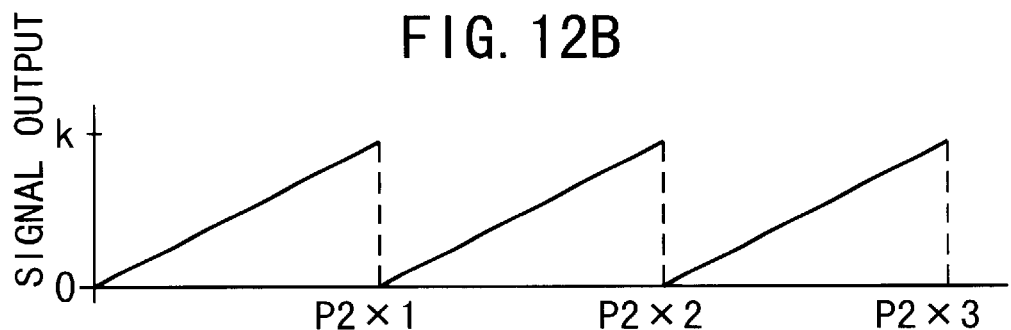
Figure 12C:
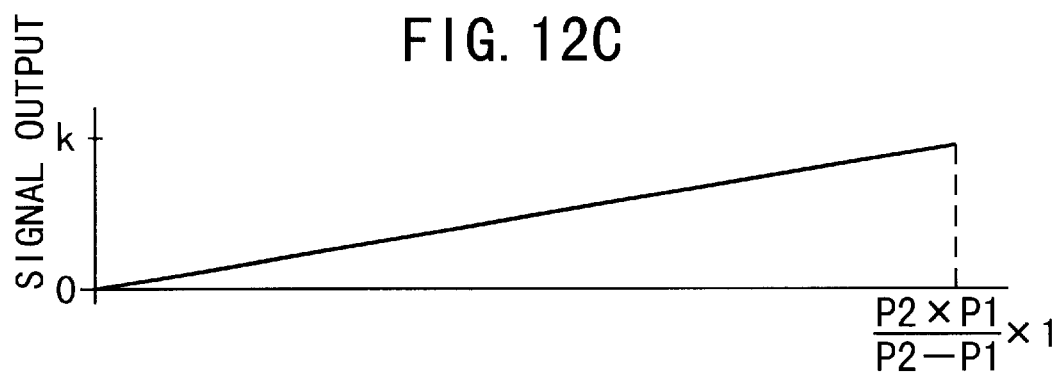
Figure 12D:
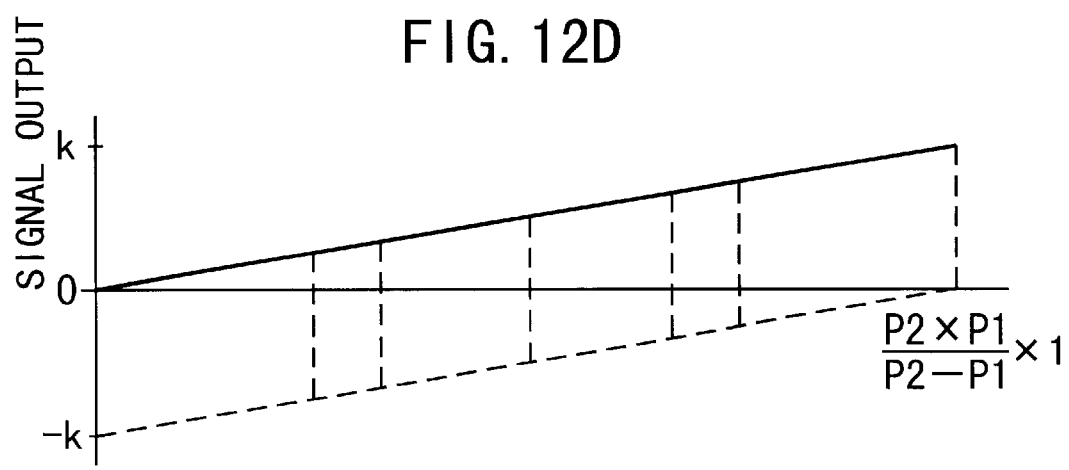

FIG. 10 illustrates a configuration of a linear encoder 100 which incorporates the system of the second embodiment specifically therein. The encoder 100 is configured to integrate the three displacement detectors 801, 802 and 803 shown in FIG. 8. The encoder 100 comprises a scale 101 and a sensor head 102. Formed in parallel on the scale 101 are three scale lattices 111, 112 and 113 with different lattice pitches. The sensor head 102 is mounted on the scale 101 so that it can move relatively in the length measuring direction. Provided on the sensor head 102 are displacement sensors 121, 122 and 123 that oppose to the scale lattices 111, 112 and 113, respectively. The displacement sensors 121, 122 and 123 vary their optical, electrical or magnetic couplings with the scale lattices in response to a relative displacement of the sensor head 102 to the scale 101, and they generate bi-phase sine wave signals (S1A, S1B), (S2A, S2B) and (S3A, S3B) with different signal periods corresponding to the lattice pitches, respectively.

In the scale 101, graduations of the three scale lattices 111, 112 and 113 are determined coincident with each other on the position of origin as shown in the figure. This allows the bi-phase sine wave signals (S1A, S1B), (S2A, S2B) and (S3A, S3B) obtained from the displacement sensors 121, 122 and 123 to have their phases that come to zeros at the position of origin, eliminating the need for adjusting their original phases. An absolute measuring circuit 103 is possible to measure an absolute displacement by taking these two sets of bi-phase sine wave signals therein. The absolute measuring circuit 103 includes the wavelength composing circuits 811–813 shown in FIG. 8 and the phase detecting unit 4, fraction distance arithmetic unit 5 and total distance arithmetic unit 6 shown in FIG. 9.

[Fourth Embodiment]

FIG. 11 is an embodiment of a lightwave interferometer 200 for measuring a length which incorporates the system of the second embodiment therein. The lightwave interferometer 200 is configured to integrate the three displacement detectors 801, 802 and 803 shown in FIG. 8. The lightwave interferometer 200 comprises a Michelson's coherent optics typically used for bi-beam interferometric measurement and includes three coherent light sources 201, 202 and 203 for emitting coherent lights with different wavelengths of λ1, λ2 and λ3. Light beams output from the light sources 201, 202 and 203 partially reflect from and partially transmit through a polarized beam splitter 205, respectively. The reflected light beams from the polarized beam splitter 205 enter into a stationary corner cube 204, then reflect from it and return to the polarized beam splitter 205. A corner cube 206 is located relatively movable to the polarized beam splitter 205. The transmitted light beams through the polarized beam splitter 205 enter into the corner cube 206, then reflect from it and return to the polarized beam splitter 205.

The above reflected lights and transmitted lights, now the further reflected lights from the stationary corner cube 204 and the movable corner cube 206 interfere with each other, with holding the difference between light paths corresponding to a measurement distance L, and enter into photodetectors 211, 212 and 213. These photodetectors 211, 212 and 213 generate bi-phase sine wave signals (S1A, S1B), (S2A, S2B) and (S3A, S3B). An absolute measuring circuit 214 takes these bi-phase sine wave signals (S1A, S1B), (S2A, S2B) and (S3A, S3B) therein to compute an absolute displacement in the same arithmetic process as was described in the second embodiment. Also in this case, the absolute measuring circuit 214 includes the wavelength composing circuits 811–813 shown in FIG. 8 and the phase detecting unit 4, fraction distance arithmetic unit 5 and total distance arithmetic unit 6 shown in FIG. 9.

In this embodiment, the differences between light paths of the three bi-beams come to zeros in the case of the displacement L=0 where the fixed corner cube 204 contacts with the movable corner cube 206 if optical components have ideal shapes. This can be achieved regardless to the positions of the light sources 201, 202 and 203 as well as the positions of the photodetectors 211, 212 and 213, eliminating a special adjustment for zero-setting.

The present invention is not limited in the above embodiments. For example, it is also possible to prepare a fourth displacement detector for performing the wavelength composing when the measuring range is not enough even if using the largest signal period PI that is obtained from the multiple wavelength composing described in the second embodiment. In addition, an individual means for measuring a length may also be employed to specify the number of periods of the medium resolution signal in a coarse resolution signal that is the synthesized signal SI with the largest signal period. For example, in the arrangement of FIG. 11, the three light sources comprise a 594 nm He—Ne laser, 612 nm He—Ne laser and 633 nm He—Ne laser. Three bi-phase sine wave signals obtained in this case have periods of P1=594/2=297 [nm], P2=612/2=306 [nm] and P3=633/2= 316.5 [nm]

Obtained from synthesizing these signals by the method described in the second embodiment are synthesized signals that have periods of Px, Py and PI; Px=10.1 [$\mu$m], Py=9.2 [$\mu$m] and PI=106.7 [$\mu$m], respectively. The signal periods extended up to such the extent can be specified through measurements with calipers, for example, without the period numbers arithmetic.

The wavelengths of 612 nm He—Ne laser and 633 nm He—Ne laser can be stabilized. Accordingly, when performing a final absolute measurement with the wavelength-stabilized 633 nm He—Ne laser, a measurement can be achieved at an extremely high precision. Because its wavelength stability is about $10^{-8}$, and an uncertainty for a measured value of 100 mm is 100 [mm]$\times 10^{-8}$=1 [nm], for example. In addition, an absolute value of the wavelength of the wavelength-stabilized He—Ne laser light source can be calibrated precisely using a standard light source. Therefore, an absolute measurement can be achieved on the basis of the international traceable system.

As described above, according to the present invention, an absolute position can be obtained precisely within a period of a composed bi-phase sine wave signal with a long period, which is obtained through a wavelength composing with a simple arithmetic including multiplication, addition and subtraction of two bi-phase sine wave signals.

In addition, according to the present invention, a coarse resolution signal with a high period precision can be obtained by performing multiple wavelength composing, in which two bi-phase sine wave signals are obtained by performing wavelength composing among three bi-phase sine wave signals and are further directed to another wavelength composing. As a result, an absolute position can be measured precisely within a wider measuring range.

Having described the embodiments consistent with the invention, other embodiments and variations consistent with the invention will be apparent to those skilled in the art. Therefore, the present invention should not be viewed as limited to the disclosed embodiments but rather should be viewed as limited only by the spirit and scope of the appended claims.

What is claimed is:

1. A measuring device for absolute measurement of displacement, comprising:

a first displacement detector for generating a sine wave signal S1A and a cosine wave signal S1B both with a period of P1 in accordance with a displacement L to be detected;

a second displacement detector provided in parallel to said first displacement detector for generating a sine wave signal S2A and a cosine wave signal S2B both with a period of P2 different from said period of P1 in accordance with said displacement L to be detected;

wavelength composing means for composing said sine wave signals S1A, S2A and said cosine wave signals S1B, S2B from said first and second displacement detectors to obtain a sine wave signal, SxA=S1A·S2B−S1B·S2A, and a cosine wave signal, SxB=S1B·S2B+S1A·S2A, both with a period of Px equal to the least common multiple between said periods P1 and P2;

phase detecting means for detecting a phase of a fine resolution signal comprising either of output signals obtained from said first and second displacement detectors and a phase of a coarse resolution signal comprising the output signal from said wavelength composing means; and distance arithmetic means for computing said displacement L as an absolute position within said period Px based on phase information detected by said phase detecting means.

2. The measuring device according to claim 1, wherein said distance arithmetic means including:

fraction distance arithmetic means for interpolating said phase information detected by said phase detecting means to obtain a fraction distance D0 and a distance Lx within said periods P0 (=P1 or P2) and Px of said fine and coarse resolution signals; and total distance arithmetic means for obtaining period numbers of said fine resolution signal, N0, contained in said distance Lx obtained from said fraction distance arithmetic means and performing a computation of said displacement, L=N0·P0+D0, using said period numbers N0.

3. The measuring device according to claim 2, wherein said total distance arithmetic means including:

period numbers arithmetic means for computing period numbers N0' by dividing said distance Lx by said period P0; and period numbers correction means for obtaining period numbers N0 by correcting said period numbers N0' in accordance with a magnitude of a finite difference between an assumed fraction distance D0' obtained as the remainder from said period numbers arithmetic means and said fraction distance D0, and with a phase relation of said fraction distance D0' within said period P0.

4. The measuring device according to claim 3, wherein said period numbers correction means corrects said period numbers as:

(a)

$$N0'+1=N0, \text{ when } P0/2<D0<P0 \text{ and } P0/2<|D0-D0'|;$$

(b)

$$N0'-1=N0, \text{ when } 0<D0<P0 \text{ and } P0/2<|D0-D0'|;$$

and (c)

$$N0'=N0 \text{ in other cases.}$$

5. A measuring device for absolute measurement of displacement, comprising:

a first displacement detector for generating a sine wave signal S1A and a cosine wave signal S1B both with a period of P1 in accordance with a displacement L to be detected;

a second displacement detector provided in parallel to said first displacement detector for generating a sine wave signal S2A and a cosine wave signal S2B both with a period of P2 ($\neq$P1) in accordance with said displacement L to be detected;

a third displacement detector provided in parallel to said first and second displacement detectors for generating a sine wave signal S3A and a cosine wave signal S3B both with a period of P3 ($\neq$P2, P1, and |P3−P2|$\neq$|P2−P1|) in accordance with said displacement L to be detected;

first wavelength composing means for composing said sine wave signals S1A, S2A and said cosine wave signals S1B, S2B obtained from said first and second displacement detectors to obtain a sine wave signal, SxA=S1A·S2B−S1B·S2A, and a cosine wave signal, SxB=S1B·S2B+S1A·S2A, both with a period of Px equal to the least common multiple between said periods P1 and P2;

second wavelength composing means for composing said sine wave signals S2A, S3A and said cosine wave signals S2B, S3B obtained from said second and third displacement detectors to obtain a sine wave signal, Say=SAA·S1B−S1B·SAA, and a cosine wave signal, Sib=S2B·S3B+S2A·S3A, both with a period of Py equal to the least common multiple between said periods P2 and P3;

third wavelength composing means for composing said sine wave signals SxA, SyA and said cosine wave signals SxB, SyB obtained from said first and second wavelength composing means to obtain a sine wave signal, SIA=SxA·SyB−SxB·SyA, and a cosine wave signal, SIB=SxB·SyB+SxA·SyA, both with a period of PI equal to the least common multiple between said periods Px and Py;

phase detecting means for detecting a phase of a fine resolution signal comprising either of output signals obtained from said first through third displacement detectors, a phase of a medium resolution signal comprising an output signal from said first or second wavelength composing means, and a phase of a coarse resolution signal comprising the output signal from said third wavelength composing means; and distance arithmetic means for computing said displacement L as an absolute position within said period PI based on phase information of said fine, medium and coarse resolution signals detected by said phase detecting means.

6. The measuring device according to claim 5, wherein said distance arithmetic means including:

fraction distance arithmetic means for interpolating said phase information detected by said phase detecting means to obtain each fraction distance within said periods of said fine, medium and coarse resolution signals; and total distance arithmetic means for obtaining a preliminary total distance from period numbers and a fraction distance of said medium resolution signal contained in said distance obtained from said fraction distance arithmetic means with respect to said coarse resolution signal and performing a computation to obtain a final total distance from period numbers and a fraction distance of said fine resolution signal contained in said preliminary total distance.

7. The measuring device according to claim 6, wherein said total distance arithmetic means including:

first period numbers arithmetic means for obtaining period numbers Nx' by dividing a distance LIb obtained with respect to said coarse resolution signal by a period Px of said medium resolution signal; and first period numbers correction means for obtaining period numbers Nx by correcting said period numbers Nx' in accordance with a magnitude of a finite difference between an assumed fraction distance Dx' obtained as the remainder from said first period numbers arithmetic means and said fraction distance Dx obtained on the basis of said medium resolution signal, and with a phase relation of said assumed fraction distance Dx' within said period Px of said medium resolution signal;

first total distance arithmetic means for obtaining a preliminary total distance, Lx=Px·Nx+Dx, based on period numbers Nx obtained from said first period numbers correction means and said period Dx and fraction distance Dx of said medium resolution signal;

second period numbers arithmetic means for obtaining period numbers N1' by dividing said preliminary total distance Lx obtained from said first total distance arithmetic means by said period P1 of said fine resolution signal;

second period numbers correction means for obtaining period numbers N1 by correcting said period numbers N1' in accordance with a magnitude of a finite difference between an assumed fraction distance D1' obtained as the remainder from said second period numbers arithmetic means and said fraction distance D1 obtained on the basis of said fine resolution signal, and a phase relation of said assumed fraction distance D1' within said period P1 of said fine resolution signal; and second total distance arithmetic means for obtaining a final total distance, L1=P1·N1+D1, based on said period numbers N1 obtained from said second period numbers correction means and said period P1 and fraction distance D1 of said fine resolution signal.

8. The measuring device according to claim 7, wherein said first period numbers correction means corrects said period numbers as:

(a)
$$Nx'+1=Nx, \text{ when } Px/2<Dx'<Px \text{ and } Px/2<|Dx-Dx'|;$$

(b)
$$Nx'-1=Nx, \text{ when } 0<Dx'<Px \text{ and } Px/2<|Dx-Dx'|;$$

and (c)
$$Nx'=Nx \text{ in other cases.}$$

9. The measuring device according to claim 7, wherein said second period numbers correction means corrects said period numbers as:

(a)
$$N1'+1=N1, \text{ when } P1/2<D1'<P1 \text{ and } P1/2<|D1-D1'|;$$

(b)
$$N1'-1=N1, \text{ when } 0<D1'<P1 \text{ and } P1/2<|D1-D1'|;$$

and (c)
$$N1'=N1 \text{ in other cases.}$$

10. The measuring device according to claim 5, wherein said first through third displacement detectors are integrated in a single encoder, said encoder including:

a scale having three scale lattices with different pitches; and a sensor head mounted relatively movable on said scale for generating said sine wave signal S1A and cosine wave signal S1B, said sine wave signal S2A and cosine wave signal S2B, and said sine wave signal S3A and cosine wave signal S3B through an optical, electrical or magnetic coupling with said three scale lattices.

11. The measuring device according to claim 5, wherein said first through third displacement detectors are integrated in a single lightwave interferometer for measuring a length, said lightwave interferometer including:

three coherent light sources with different wavelengths;

a polarized beam splitter for passing a part of output lights from each of said coherent light sources and reflecting another part thereof;

a first corner cube located at a fixed position for further reflecting each light once reflected from said polarized beam splitter and returning it to said polarized beam splitter through a constant light path;

a second corner cube located relative movable to said polarized beam splitter for reflecting each light passed through said polarized beam splitter and returning it to said polarized beam splitter through a light path corresponding to a distance of said relative movement; and three photodetectors for detecting each interfered light with each wavelength at said polarized beam splitter to generate said sine wave signal S1A and cosine wave signal S1B, said sine wave signal S2A and cosine wave signal S2B, and said sine wave signal S3A and cosine wave signal S3B, respectively.

* * * * *